US011074505B2

United States Patent
Baker

(12) United States Patent
(10) Patent No.: US 11,074,505 B2
(45) Date of Patent: Jul. 27, 2021

(54) MULTI-OBJECTIVE GENERATORS IN DEEP LEARNING

(71) Applicant: D5AI LLC, Maitland, FL (US)

(72) Inventor: James K. Baker, Maitland, FL (US)

(73) Assignee: D5AI LLC, Maitland, FL (US)

( * ) Notice: Subject to any disclaimer, the term of this patent is extended or adjusted under 35 U.S.C. 154(b) by 0 days.

(21) Appl. No.: 16/646,096

(22) PCT Filed: Sep. 28, 2018

(86) PCT No.: PCT/US2018/053295
§ 371 (c)(1),
(2) Date: Mar. 10, 2020

(87) PCT Pub. No.: WO2019/067831
PCT Pub. Date: Apr. 4, 2019

(65) Prior Publication Data
US 2020/0210842 A1    Jul. 2, 2020

Related U.S. Application Data

(60) Provisional application No. 62/564,754, filed on Sep. 28, 2017.

(51) Int. Cl.
*G06N 3/08* (2006.01)
*G06N 3/04* (2006.01)
*G06N 20/00* (2019.01)
*G06N 7/00* (2006.01)
*G06N 3/063* (2006.01)
(Continued)

(52) U.S. Cl.
CPC ......... *G06N 3/088* (2013.01); *G06K 9/6267* (2013.01); *G06N 3/04* (2013.01); *G06N 3/0445* (2013.01); *G06N 3/0454* (2013.01);
*G06N 3/0472* (2013.01); *G06N 3/063* (2013.01); *G06N 3/084* (2013.01); *G06N 7/005* (2013.01);
(Continued)

(58) Field of Classification Search
CPC .............................. G06N 3/088; G06N 3/084
See application file for complete search history.

(56) References Cited

U.S. PATENT DOCUMENTS 5,131,055 A *  7/1992  Chao .................... G06N 3/0675
                                                          382/214
6,128,606 A   10/2000  Bengio et al.
(Continued)

FOREIGN PATENT DOCUMENTS

WO        2019067831 A1    4/2019

OTHER PUBLICATIONS

Makhzani et al. (Adversarial Autoencoders, May 2016, pp. 1-16) (Year: 2016).*
Lavergne et al. (Filtering artificial texts with statistical machine learning techniques, Jan. 2010, pp. 25-43) (Year: 2010).*
LeCun et al. (Object Recognition with Gradient-Based Learning, Oct. 1999, pp. 319-345) (Year: 1999).*
(Continued)

*Primary Examiner* — George Giroux
(74) *Attorney, Agent, or Firm* — K&L Gates LLP

(57) ABSTRACT

Machine-learning data generators use an additional objective to avoid generating data that is too similar to any previously known data example. This prevents plagiarism or simple copying of existing data examples, enhancing the ability of a generator to usefully generate novel data. A formulation of generative adversarial network (GAN) learning as the mixed strategy minimax solution of a zero-sum game solves the convergence and stability problem of GANs learning, without suffering mode collapse.

27 Claims, 6 Drawing Sheets

(51) Int. Cl.
  *G06K 9/62* (2006.01)
  *G06F 17/18* (2006.01)
  *G06F 12/0815* (2016.01)

(52) U.S. Cl.
  CPC ......... *G06N 20/00* (2019.01); *G06F 12/0815* (2013.01); *G06F 17/18* (2013.01); *G06N 3/0481* (2013.01)

(56) References Cited

U.S. PATENT DOCUMENTS

| 8,527,276 B1 | 9/2013 | Senior et al. | |
|---|---|---|---|
| 2014/0358828 A1 | 12/2014 | Phillipps et al. | |
| 2015/0163121 A1* | 6/2015 | Mahaffey | H04L 63/1425 707/687 |
| 2018/0218261 A1* | 8/2018 | Myara | H04W 12/12 |

OTHER PUBLICATIONS

Franco-Salvador et al. (Cross-language plagiarism detection over continuous-space- and knowledge graph-based representations of language, Nov. 2016, pp. 87-99) (Year: 2016).*
Danihelka et al. (Comparison of Maximum Likelihood and GAN-based training of Real NVPs, May 2017, pp. 1-10) (Year: 2017).*
Nguyen et al. (Dual Discriminator Generative Adversarial Nets, Sep. 2017, pp. 1-11) (Year: 2017).*
International Search Report and Written Opinion for International PCT Application No. PCT/US2018/053295 dated Jan. 11, 2019.
Springenberg et al., Unsupervised and Semi-supervised Learning with Categorical Generative Adversarial Networks (Apr. 30, 2016), published as a conference paper at ICLR 2016, pp. 1-20.
Salunkhe et al., A Plagiarism Detection Mechanism Using Reinforcement Learning, International Journal of Advance Research in Computer Science and Management Studies (Nov. 2013), 1(6):125-129.

* cited by examiner

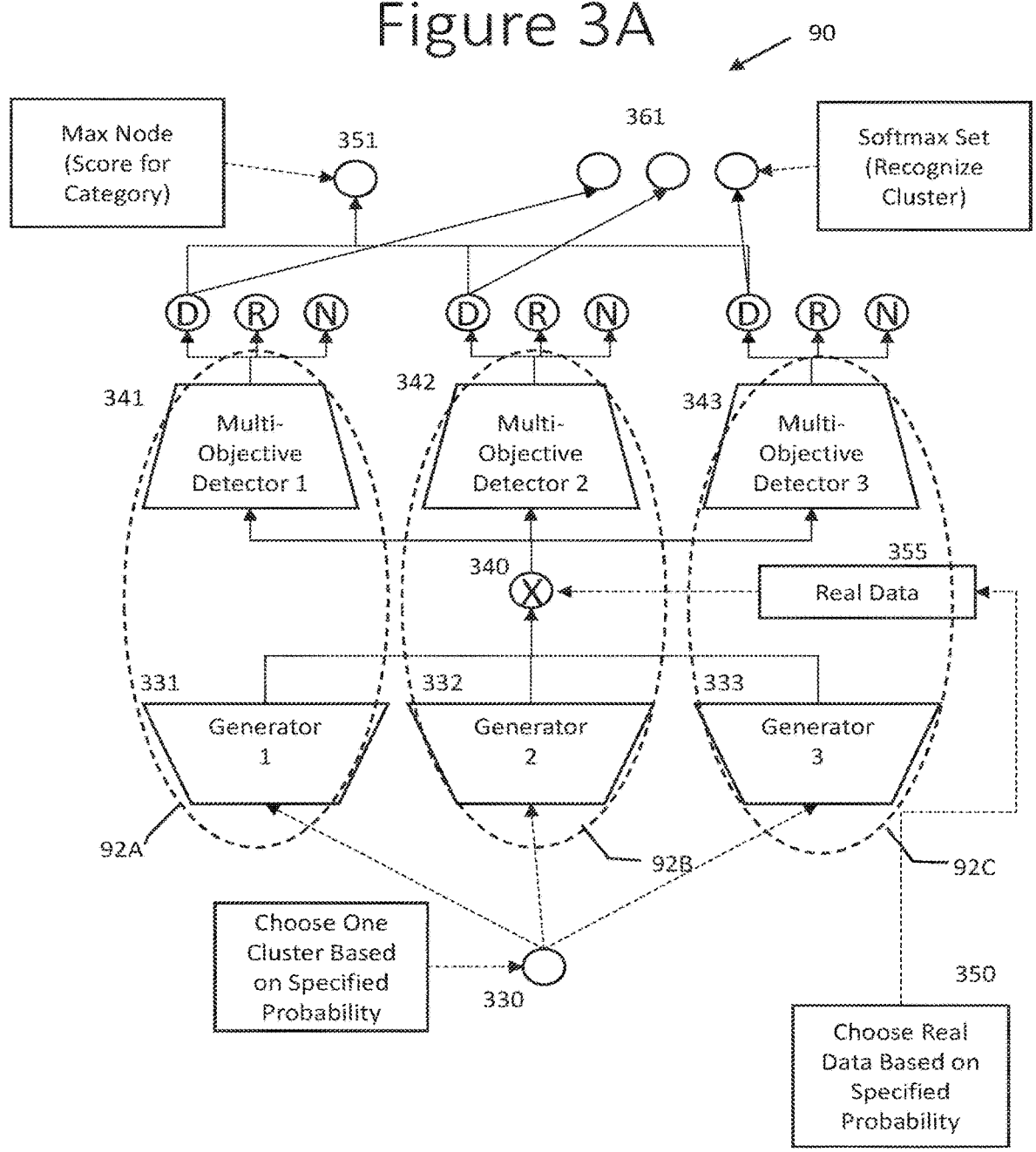

MULTI-OBJECTIVE GENERATORS IN DEEP LEARNING

PRIORITY CLAIM

The present application is a national stage application under 35 U.S.C. § 371 of PCT application Serial No. PCT/US2018/053295, which claims priority to both (i) U.S. provisional patent application Ser. No. 62/564,754, entitled "Aggressive Development with Cooperative Generators," filed Sep. 28, 2017, and (ii) PCT Application No. PCT/US18/51069, filed Sep. 14, 2018, entitled "Mixture of Generators Model," both of which are incorporated herein by reference in their entirety.

BACKGROUND

Generative modeling is an active and growing subfield within unsupervised and semi-supervised machine learning. The goal of generative models is to represent the latent variables that describe a data distribution that can produce or reproduce data examples in high-dimensional space. Two methods, Variational Autoencoders (VAEs) and Generative Adversarial Networks (GANs), have emerged as leading techniques for generative modeling within artificial intelligence and deep learning. One typical example is images, where generative models can be used to produce new images that appear realistic and are highly similar to those in a set of training examples, without exactly reproducing the existing images on which the generative model was trained. Trained with stochastic gradient descent in coordination with deep neural networks that serve as universal function approximators, VAEs and GANs can be used to generate many types of realistic data.

A key aspect of generative models is that they should not simply reproduce data examples used in training, but should be able to generate novel data that is similar to, but different from, any example in the training set. Both VAEs and GANs are trained by attempting to minimize objective cost functions that achieve a minimum by exactly reproducing training data. Further, GANs frequently suffer from mode collapse, where the GAN generates representatives of only a small proper subset of the modes of a multi-modal distribution, in some cases generating representatives of only a single mode. This reduces diversity among generated data and limits the usefulness of GANs in some applications.

There is an additional problem that is specific to GANs: stabilization of GANs learning remains an open problem. The original formulation as a zero-sum game failed to converge. An alternate reformulation as a non-zero-sum game should theoretically converge but does not seem to improve convergence in practice.

SUMMARY

The present invention, in one general aspect, is designed to overcome these and other limitations in VAEs and GANs by using an additional objective to avoid generating data that is too similar to any previously known data example. This prevents plagiarism or simple copying of existing data examples, enhancing the ability of a generator to usefully generate novel data. A formulation of GANs learning as the mixed strategy minimax solution of a zero-sum game solves the convergence and stability problem of GANs learning. At the same time, the present invention does not suffer from mode collapse, the way GANs can.

These and other benefits of the present invention will be apparent from the description that follows.

FIGURES

Various embodiments of the present invention are described herein by way of example in connection with the following figures, wherein:

FIG. 3A illustrates a block diagram of a system with a plurality of generators and a plurality of classifiers according to one aspect of this disclosure;

DETAILED DESCRIPTION

Figure 1:
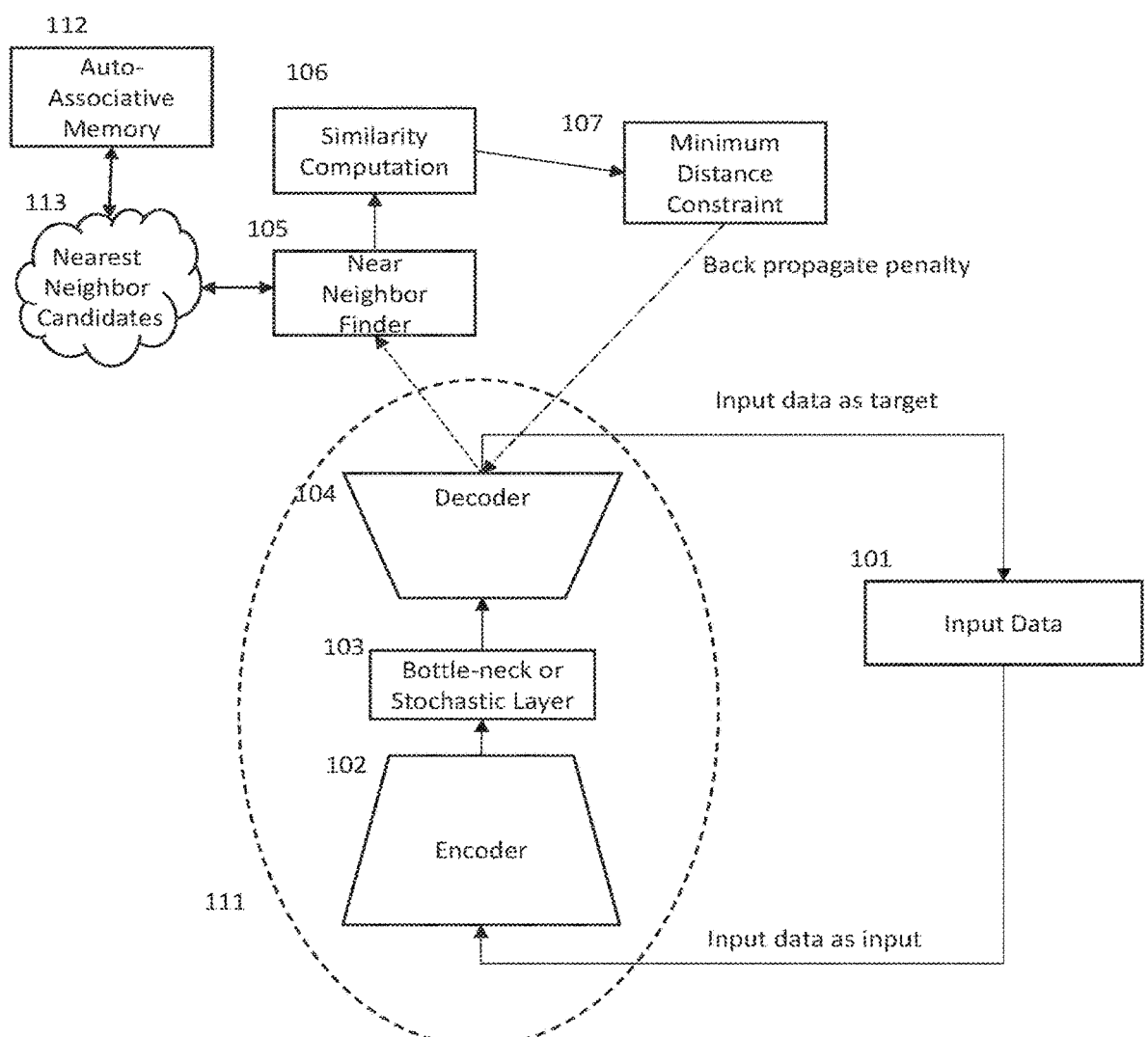
FIG. 1 illustrates a block diagram of an autoencoder having an additional objective, according to one aspect of this disclosure.
Figure 2:
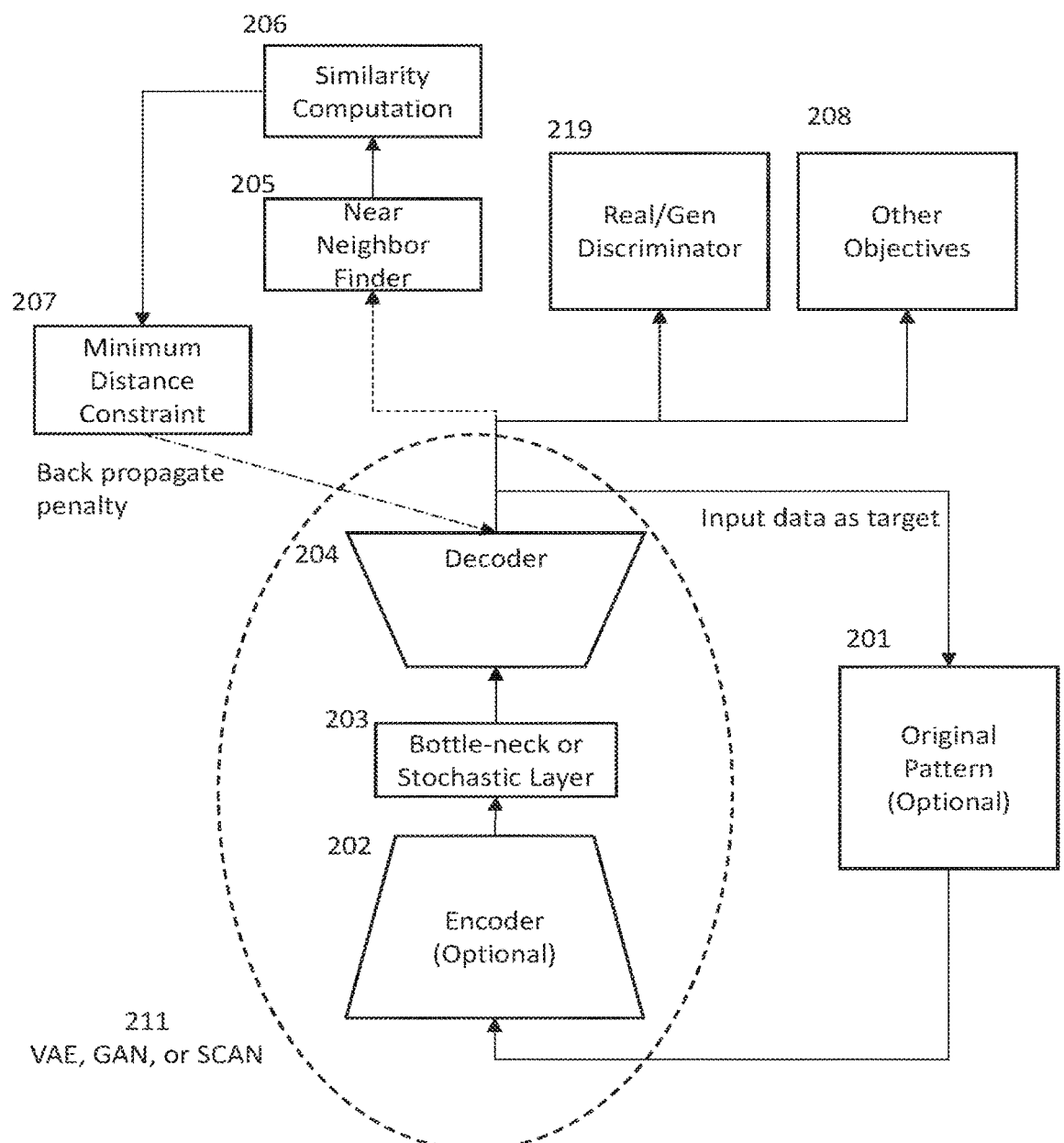
FIG. 2 illustrates a block diagram of a generator including a real-vs-generated discriminator, according to one aspect of this disclosure.
Figure 3:
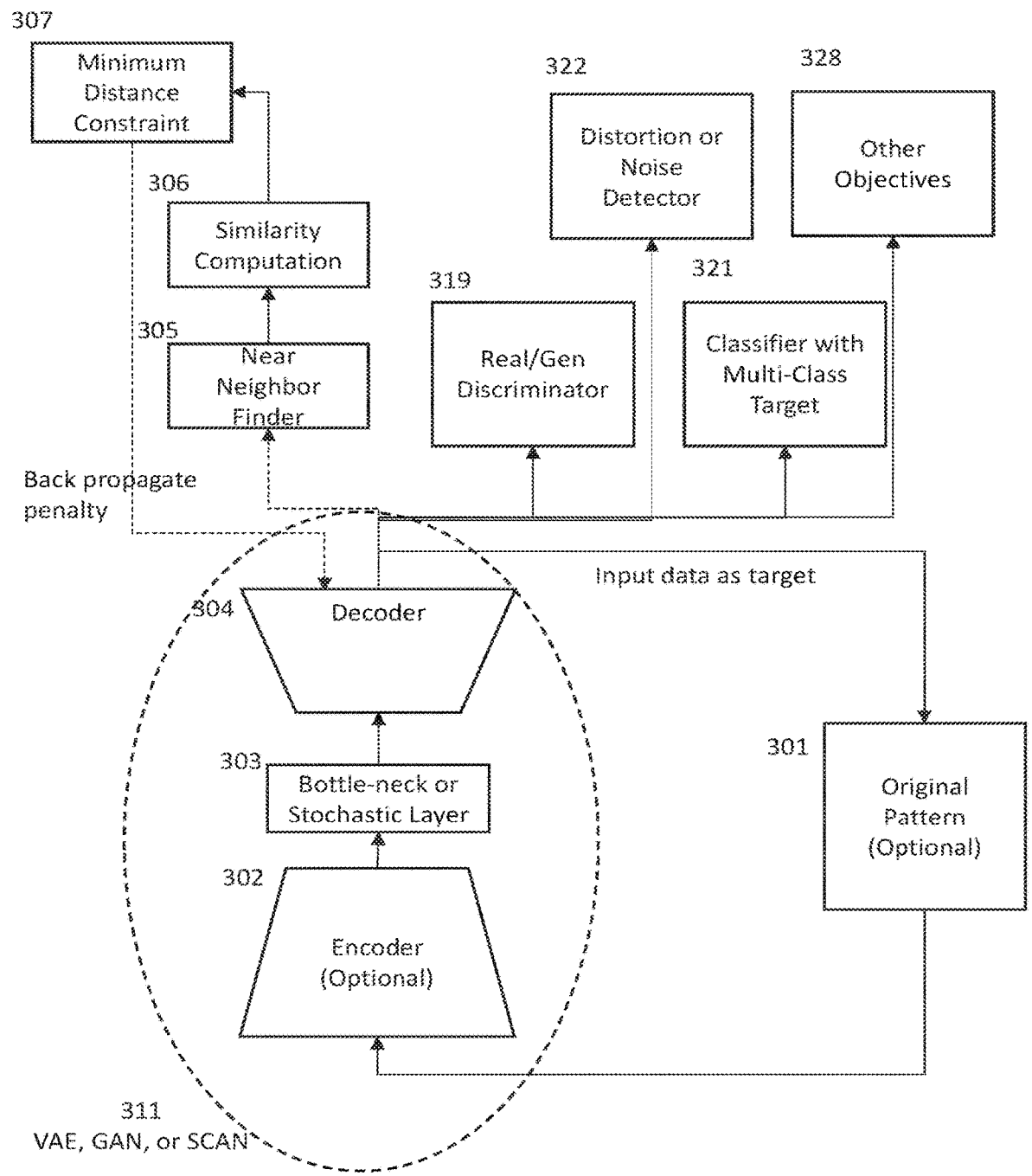
FIG. 3 illustrates a block diagram of a generator including a real-vs-generated discriminator, according to one aspect of this disclosure.
Figure 4:
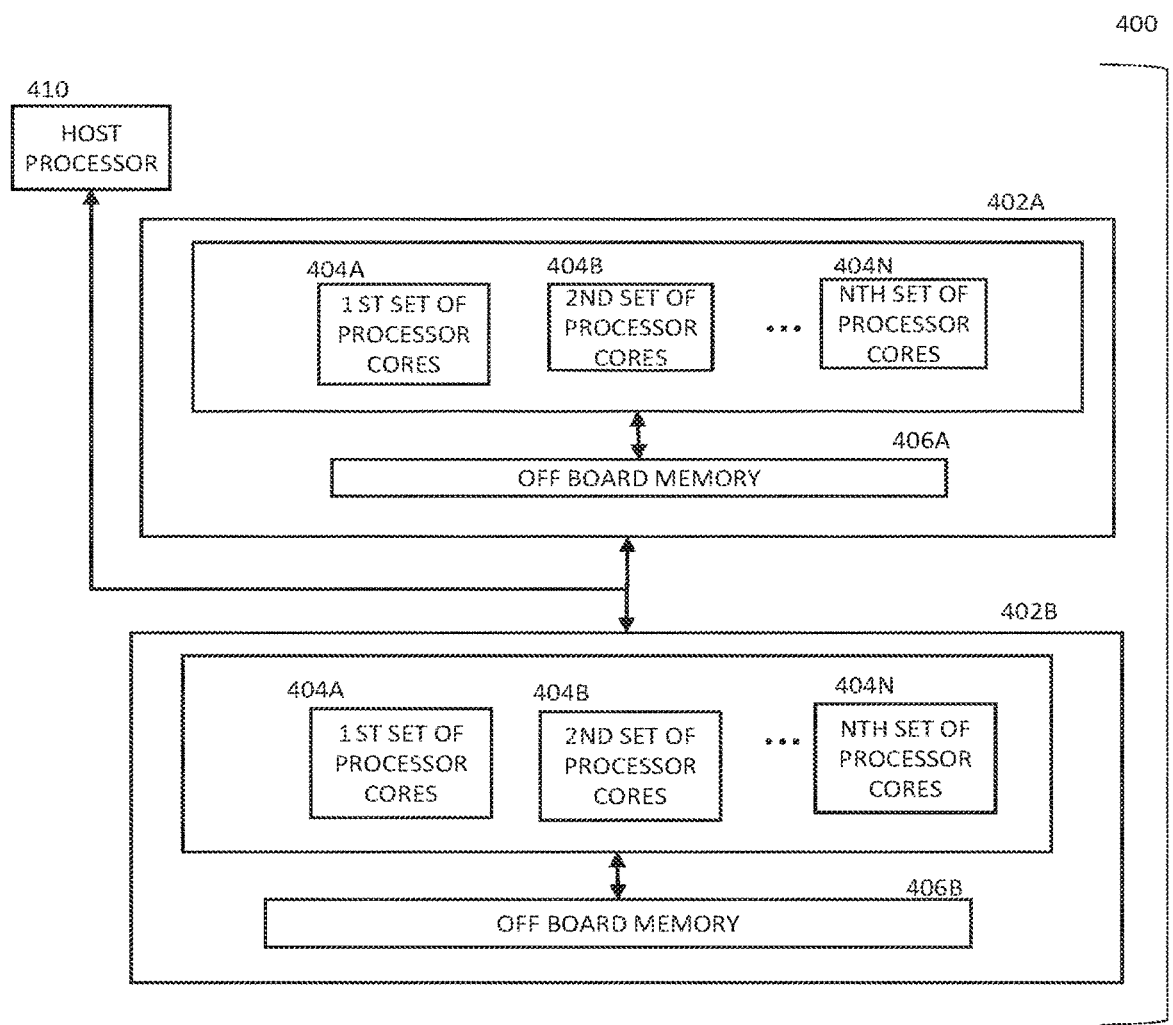
FIG. 4 is a diagram of a computer system that may be used to implement various embodiments, according to one aspect of this disclosure.

FIGS. 1, 2, and 3 are block diagrams of machine-learning systems according to various embodiments of the invention that may be implemented on a computer system, such as the computer system 400 in FIG. 4. Many components of the machine-learning systems in FIGS. 1-3 are neural networks. Before explaining further the components of the current invention, a summary explanation of neural networks is provided.

Figure 5:
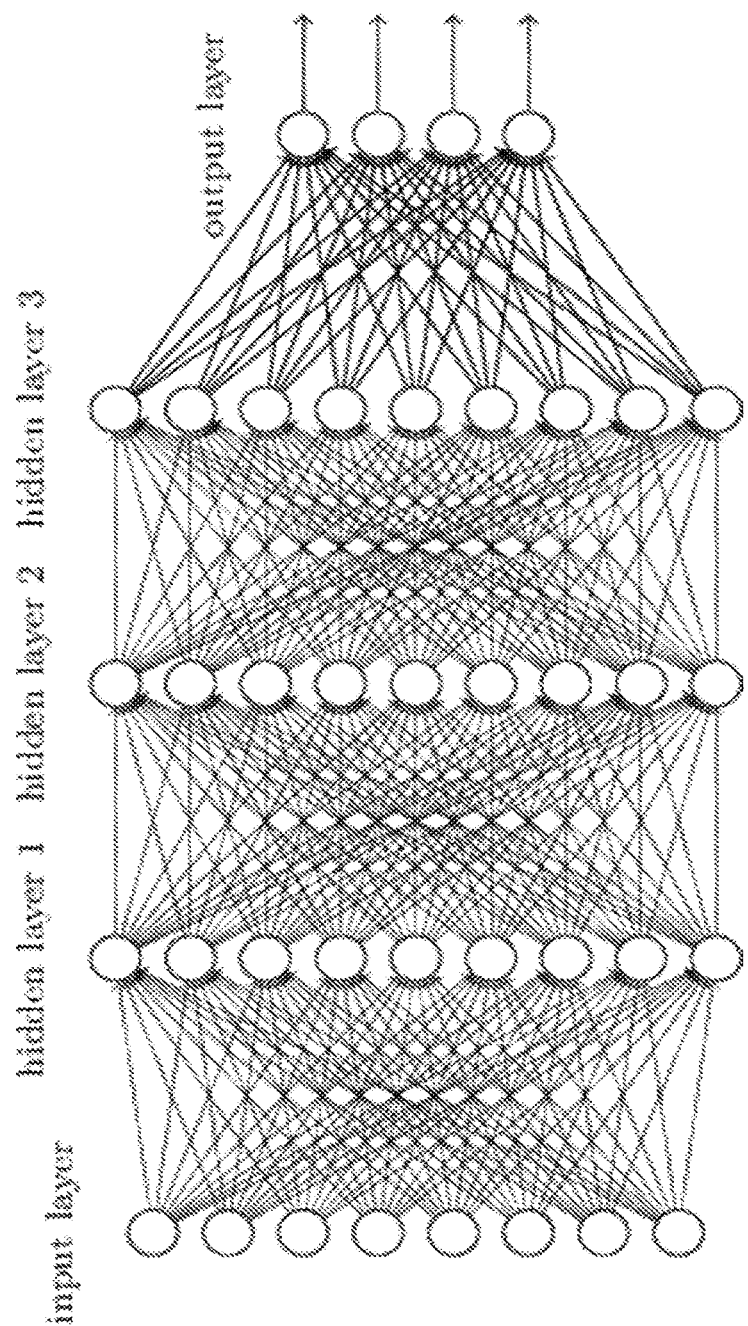
FIG. 5 is a diagram illustrating a deep neural network of the type that might be used in various aspects of various embodiments of the invention.

A diagram of an example neural network is shown in FIG. 5. As shown in this figure, a neural network is a collection of nodes and directed arcs. The nodes in a neural network are often organized into layers. In a feed-forward neural network, the layers may be numbered from bottom to top, when diagramed as in FIG. 5. Each directed arc in a layered feed-forward neural network goes from a source node in a lower layer to a destination node in a higher layer. The feed-forward neural network shown in FIG. 5 has an input layer, an output layer, and three inner layers (although a deep neural network could be fewer or more inner layers). An inner layer in a neural network is also called a "hidden" layer. Each directed arc is associated with a numerical value called its "weight." Typically, each node other than an input node is associated with a numerical value called its "bias." The weights and biases of a neural network are called "learned" parameters. During training, the values of the learned parameters are adjusted by a computer system such as the computer system 400 shown in FIG. 4. Other parameters that control the training process are called hyperparameters.

A feed-forward neural network may be trained by the computer system 400 using an iterative process of stochastic gradient descent with one iterative update of the learned parameters for each minibatch. The full batch of training data is typically arranged into a set of smaller, disjoint sets called minibatches. An epoch comprises the computer system 400 doing a stochastic gradient descent update for each minibatch contained in the full batch of training data. For each minibatch, the computer system 400 estimates the gradient of the objective (or cost) function for a training data item by first computing the activation of each node in the network using a feed-forward activation computation. The computer system 400 then estimates the partial derivatives of the objective with respect to the learned parameters using a process called "back-propagation," which computes the partial derivatives based on the chain rule of calculus, proceeding backwards through the layers of the network. The processes of stochastic gradient descent, feed-forward computation, and back-propagation are well-known to those skilled in the art of training neural networks. Some of the components of the machine-learning systems of FIGS. 1 through 3 that can comprise neural networks include the encoders 102, 202, 302; the decoders 104, 204, 304; the real v. generated discriminators 219, 319; the classifier 321; the machine-learning systems 208, 328; and the distortion (or noise) detector 322, for example.

Having generally summarized neural networks, attention is now directed to FIG. 1, which shows a block diagram of an autoencoder. An autoencoder is a type of machine learning system that can learn efficient data coding and may be used to generate data examples. Use of an autoencoder as a generator is well-known to those skilled in the art of neural networks. Although the illustrative embodiment shown in FIG. 1 uses a variational autoencoder (VAE) as generator 111, it is to be understood that some other form of generator may be used, such as a stochastic categorical autoencoder network (SCAN). More details about SCANs are provided in U.S. patent application Ser. No. 16/124,977, filed Sep. 7, 2018, entitled "Stochastic Categorical Autoencoder Network." Typical auto-encoders include, as depicted in FIG. 1, an encoder 102 that is trained to produce, from training examples 101, a layer 103 that is a bottle-neck layer in the case of a conventional autoencoder, or a stochastic layer in the case of a VAE or SCAN. A decoder 104 is then trained to produce the training examples 101 from the bottle-neck or stochastic layer 103, as the case may be.

An autoencoder network is sometimes said to learn by "unsupervised" training, because it does not require labeled training data. More precisely, an autoencoder network learns by "self-supervised" training. The learning of an autoencoder network may use stochastic gradient descent training just as in supervised training. However, the autoencoder provides its own objective target, which is just a copy of the input data 101.

For any input data item 101, the computer system provides the input 101 to the autoencoder system 111. During training, the computer system 400 also supplies a copy of input 101 as a target for the output of decoder 104, which is also the output of autoencoder system 111. If the autoencoder system 111 is a conventional deterministic autoencoder, the autoencoder system 111 computes its output by feed forward activation of the nodes in the neural networks 102, 103, and 104. If the autoencoder system 111 is a stochastic autoencoder, such as a VAE or a SCAN, then the encoder 102 produces as output the values of parameters that determine a parametric probability distribution. For example, the parameters may specify the means and standard deviations (or other central tendency and dispersion statistics) for a set of Gaussian random variables. If the autoencoder system 111 is a VAE, these parameters are trained to minimize the Kullbach-Leibler divergence of the probability distribution averaged over the training data as a regularization imposed in addition to the objective of minimizing the error function from comparing the output of the decoder 103 with the copy of the input as a target. If the autoencoder system 111 is a SCAN, these parameters are trained just to minimize the error function, but subject to a constraint on the parameters determining the probability distribution. For example, the means may be all constrained to be less than or equal to 1.0 in absolute value and the standard deviations may all be constrained to be greater than or equal to 1.0. For either type of stochastic autoencoder, the computer system 400 generates a set of random variables according to the probability distributions specified by the parameters output by the encoder 102 for the input 101. The values of these random variables are then the input for the decoder 104. The output of encoder 104, which is also the output for the autoencoder system 111, may then be computed by the computer system 400 as a feed-forward activation.

A difference between the illustrative embodiment shown in FIG. 1 from a regular deterministic or stochastic autoencoder comprises the blocks 105 (nearest neighbor finder), 106 (similarity computation) and 107 (minimum distance constraint). These blocks, which represent processes and/or constraints (as opposed to machine learning systems or networks) provide an additional objective to the autoencoder 111 for training the autoencoder 111 as described below. To generate the additional objective, the computer system 400 first sets a minimum distance criterion in block 107. The minimum distance criterion may be determined by a hyper-parameter.

At the nearest neighbor finder block 105, the computer system 400 finds the nearest neighbor it can in a set of nearest neighbor candidates 113 to the output pattern generated by the decoder 104 for an input data item 101. Any suitable algorithm can be used to find the nearest neighbor, such as the k-nearest neighbors algorithm. In some embodiments, the computer system 400 at the nearest neighbor finder block 105 finds near neighbor candidates by retrieving them as the output from a robust auto-associative memory 112, such as a Hopfield network or a robust auto-associative memory as described in PCT Application No. PCT/US18/51683, filed Sep. 19, 2018, entitled Robust Auto-Associative Memory with Recurrent Neural Network, which is incorporated herein in its entirety. The dotted arrow from the decoder 104 to the nearest neighbor finder block 105 indicates that the nearest neighbor finder block 105 receives data from the decoder 104 (e.g., the output of the decoder 104) but does not directly back propagate partial derivatives to the decoder 104. Instead, conditional on detection of a violation of the minimum distance constraint at the minimum distance constraint block 107, partial derivatives of a penalty term may be propagated from the minimum distance constraint block 107 directly to the decoder 104. In the illustrative embodiment shown in FIG. 1, as explained in association with the minimum distance constraint block 107, it is more important for the computer system 400 at the nearest neighbor finder block 105 to accurately determine the nearest neighbor as the output of the decoder 104 gets closer to that neighbor. Auto-associative memories tend to have the property of being most accurate when retrieving such a close match.

At the similarity computation block 106, the computer system 400 computes the distance between (i) the nearest neighbor found at the nearest neighbor finder block 105 and (ii) the output pattern from the decoder 104 based on a distance measure. Any suitable distance measure may be used, such as the Euclidean distance measure or some other metric in the data space of the input variables. In some embodiments, it may be a distance measure in some encoding, such as a feature vector. A feature vector may be obtained, for example, by an encoder trained as a nonstochastic autoencoder with the feature vector as the bottleneck layer. In some embodiments, the feature vector may be obtained as an intermediate stage in a classifier, such as, for example, the vector representation in a Word2Vec system.

Whatever the distance measure, at the minimum distance constraint block 107 the computer system 400 compares the distance computed at the similarity computation block 106 to a constraint that sets a minimum allowed value for the distance. At the minimum distance constraint block 107, the computer system 400 may add an extra, positive penalty term to the cost function for the back-propagation of the generator/autoencoder 111 if the minimum distance constraint is violated (i.e., if the distance is less than the minimum allowed distance). This prevents the generator 111 from simply copying the input and helps the generator 111 learn to generalize from the training data 101. Autoencoder systems including an additional objective function, such as the system described in connection with FIG. 1, could be utilized, for example, as a system to detect plagiarism by being able to detect patterns that are close, but not exact, matches to the original pattern.

The penalty term can be constant for any violation, or it could vary based on the scope of the violation. For example, the penalty term could be smaller when the distance to the nearest neighbor is close to (but still less than) the minimum distance and greater when the distance to the nearest neighbor is close to zero. The variability of the penalty could vary linearly or non-linearly with the difference between the distance to the nearest neighbor and the minimum distance constraint. Preferably, the penalty term added by the minimum distance constraint block 107 has its maximum when the distance between the distance between the output of decoder 104 and the nearest neighbor, as determined by the nearest neighbor finder block 105, is zero. There is no penalty if the distance is greater than the minimum distance constraint. In general, as stated above, it is more important for the computer system 400 at the nearest neighbor finder block 105 to accurately determine the nearest neighbor the smaller the distance is to that neighbor.

FIGS. 2 and 3 are generators that use a real-vs-generated discriminator such as is used in a Generative Adversarial Network (GAN). The generator 211, 311 in FIGS. 2 and 3 may be a conventional auto-encoder, a VAE, a SCAN or a GAN. However, the generators 211, 311 each also have other objectives that help prevent mode collapse during their training.

FIG. 2 is similar to FIG. 1, except for the addition of the real-vs-generated discriminator 219. Various embodiments of FIG. 2 can represent enhancements to a VAE, SCAN or a GAN. For a VAE or a SCAN as the generator 211, the encoder 202 and original patterns 201 are only used in training the generator 211. For a GAN as the generator 211, they are not used at all; a GAN has a stochastic layer 203 as its input to the decoder 204 and does not have an encoder 202. The different types of generators have different stochastic layers 203. A GAN generates a vector of random variables directly without training latent variables as output from the encoder 202. A SCAN and a VAE have different constraints in the training of the latent variables at the stochastic layer 203.

Like FIG. 1, the system of FIG. 2 uses the steps at blocks 205, 206 and 207, which are similar to blocks 105, 106 and 107 of FIG. 1, to allow the sub-system to function as an anti-plagiarism detector. Output from the real-vs-generated discriminator 219 is also back-propagated to the generator 211. That is, the real-vs-generated discriminator 219 can determine (or "discriminate") whether the output of the generator 211 is real or generated. If the output of the generator 211 looks generated to the real-vs-generated discriminator 219, the real-vs-generated discriminator 219 can back propagate an additional penalty term to the generator 211 in the training thereof, thereby effectively rewarding the generator 211 for generating realistic output patterns. Blocks 205-207 also prevent the real-vs-generated discriminator 219 from causing the generator 211 to merely memorize the training data 101. The dotted arrow from the decoder 204 to the nearest neighbor finder block 205 indicates that the nearest neighbor finder block 205 receives data from the decoder 204 but does not directly back propagate partial derivatives to the decoder 204. Instead, conditional on detection of a violation by the minimum distance constraint block 207, partial derivatives of a penalty term may be propagated from the minimum distance constraint block 207 directly to the decoder 204. In some embodiments, the real-vs-generated discriminator 219 has been trained on a dataset disjoint from the nearest neighbor set 213.

The system of FIG. 2 may also comprise an additional machine learning system 208 that supplies an additional objective for the training of the generator 211 (e.g., an objective in additional to input data target and the real-vs-generated discriminator 219). For example, the machine learning system 208 may comprise a classifier that has already been trained, before training the generator, or machine learning system 208 may be trained on the data received from the output of the decoder 204. In either case, the machine learning system 208 back propagates the partial derivatives of its classification objective to the output of the decoder 204. This additional objective helps train the generator 211 to learn to generate data that is useful for distinguishing the categories in the classifier 208. Besides improving the performance of the classifier 208, this additional objective has a regularization effect on the generator 211. In another embodiment, the machine learning system 208 may be an ensemble of classifiers or a plurality of classifiers with different objectives or different categories. The additional objectives 321 and 322 shown in FIG. 3 may alternately be viewed as possible examples of other objectives from the machine learning system 208 in FIG. 2. In general, the extra objectives from the machine learning system 208 help any of the types of generator 211 generalize from the training examples 201 and help prevent the mode collapse that might be caused by the real-vs-generated objective 219.

FIG. 3 is a block diagram of another system that can represent an enhanced version of any of the generator types. Like FIG. 2, FIG. 3 has a real-vs-generated discriminator 319 and components, e.g., blocks 305, 306 and 307, that can be utilized to allow the subsystem to function as an anti-plagiarism detector. These components operate similarly to blocks 105, 106, and 107 of FIG. 1 and prevent the real-vs-generated discriminator 319 from causing the generator 311 to merely memorize the training data. The dotted arrow from the decoder 304 to the nearest neighbor finder block 305 indicates that the nearest neighbor finder block 305 receives data from the decoder 304 but does not directly back propagate partial derivatives to the decoder 304. Instead, conditional on detection of a violation of a minimum distance constraint block 307, partial derivatives of a penalty term may be propagated from the minimum distance constraint block 307 directly to the decoder 304.

FIG. 3 adds two new types of objectives. A machine-learning distortion (or noise) detector 322 may be trained to detect noise or distortion in the output of the decoder 304. In some embodiments, the distortion (or noise) detector 322 is trained as a discriminator with supervised training including between (i) original images and (ii) noisy and distorted versions of the same images. The distortion (or noise) detector 322 may back propagate a penalty term to the generator 311 when the distortion (or noise) detector 322 determines that the output of the decoder 304 has above a threshold level of noise, thereby effectively rewarding the generator 311 for generating patterns without noise.

A machine-learning classifier 321 provides a different kind of objective; it may be a classifier that is trained separately from the generator 311, and is not necessarily being trained during the training process for the system illustrated in FIG. 3. In the training in FIG. 3, the objective from which classifier 321 back propagates to the generator 311 is a multi-target objective. That is, the target output for the classifier 321 is not a single category but rather includes target activation levels for multiple categories. For example, the objective may be for category A and category B to both have an activation of 0.5. Because no data example in the training data for the classifier 321 should have such an ambiguous score, the classifier 321 imposes an implicit constraint that the generated pattern from the decoder 304 not match the training data for the classifier 321. The training data for the classifier 321 can include the training data for the real-vs-generated discriminator 319. The multi-category target of the classifier 321 then prevents an output pattern from the decoder 304 that matches an example in the training data for the discriminator 319 from being an optimum for the overall objective.

Thus, while the real-vs-generated discriminator 319 objective rewards the generator 311 for producing realistic patterns, including the training data for the discriminator 319, the objectives from the minimum distance constraint 307 and from the classifier 321 discourage the generator 311 from exactly matching the training data 301 and encourage the decoder 304 to generalize to new patterns.

Optionally, the system illustrated in FIG. 3 may have still additional back-propagation training objectives from a machine-learning system 328. For example, the machine-learning system 328 may comprise a classifier or a plurality of classifiers, as explained in association with block 208 of FIG. 2. In general, the additional objectives from the machine-learning system 328 may have a regularizing effect, making the training of the generator 311 less likely to overfit the training data and less likely to have mode collapse.

FIGS. 2 and 3 provide two illustrative examples of ways in which multi-objective enhancements to GANs, SCANs, and VAEs can be trained to generalize from their training data and to avoid mode collapse with a real-vs-generated discriminator as one of their objectives.

Having multiple objectives helps to avoid mode collapse even without the anti-plagiarism subsystems (e.g., components 205, 206, 207 in FIG. 2 or components 305, 306, 307 in FIG. 3). In some embodiments, the subsystem comprising components 205, 206, 207 in FIG. 2 or components 305, 306, 307 in FIG. 3 may be omitted. In these embodiments, having the other multiple objectives, even without the minimum distance constraint blocks 207 or 307, will enhance the ability of the system (e.g., the data generators 211, 311) to learn to generalize to new data. The multiple objectives will also provide regularization, reducing the effective number of degrees of freedom and reducing the tendency to overfit the training data. The multiple objectives in addition to the real-vs-generated discriminators 219 or 319 will also reduce the tendency of mode collapse in GAN training.

FIG. 3A illustrates another aspect of the invention in which there are multiple generators 331, 332, 333 as well as multiple detectors 341, 342, 343, which may each embody more robust versions of the multiple objectives illustrated in FIGS. 2 and 3. FIG. 3A is a block diagram of an illustrative embodiment of a generative model of a collection of data as a mixture of clusters, with each cluster represented by a respective generator-detector pair 92A-C. In the illustrated embodiments, each category or other collection of input data is modeled as a mixture of clusters, and there is a generator-detector pair for each cluster. As such, the system 90 is called a mixture of generators model (MGM). In the illustrative embodiment shown in FIG. 3A, each detector 341, 342, or 343 is not a simple detector but rather may be a complex multi-objective classifier with each output node of each of the classifiers replaced by a more robust 3-node output distinguishing three outcomes, detection (D), rejection (R), or neutral (N, no decision). Each detector 341, 342, or 343 may embody one or more of the categorical objectives in FIGS. 2 and 3, that is, the real-vs-generated discriminator (219 or 319), the classifier with a multi-class target 321, other objectives (228 or 328), or the minimum distance constraint (207 or 307). For simplicity and clarity, only one set of three nodes D, R, and N is shown for each detector. In FIG. 3A there are only three clusters, all in the same category; hence, only three generator-detector pairs 92A-C are shown, but it is to be understood that there may be any number of clusters/generator-detector pairs per category and any number of categories or any number of clusters in unsupervised training. In some embodiments, the 3-node output of a detector 341, 342, 343 may be a single node, in which case the detector is essentially equivalent to a subsystem of FIG. 3, namely a decoder, such as decoder 304 of FIG. 3, and one or more objectives, such as 307, 319, 321, 322, and 328 of FIG. 3.

For each objective in a machine learning system, a two-node output with a softmax constraint is effectively equivalent to a single output node with a sigmoid activation function. A three-node output with a softmax constraint and a "neutral" alternative, such as in FIG. 3A, is a more robust version of the one- or two-node output, in which some data is not classified as either a detection or a rejection. It is more robust in the sense that the category "neutral" creates a margin or buffer region between the accept vs reject alternatives. There are various embodiments for training three-node detectors. One embodiment is simply to label some training data as neutral. Another embodiment is during training to label as neutral any data that is classified as "detected" by a plurality of cluster detectors of different categories or that is not labeled as "detected" by any cluster detector. Yet another embodiment is to dynamically relabel training data as "detected," "rejected," or "neutral" based on optimizing performance in testing on development data that is disjoint from the training data.

Each generator-detector pair 92A-C may comprise one generator and one detector as shown in FIG. 3A, and there preferably is one generator-detector pair 92A-C for each cluster in the category. With reference to FIG. 3A, there are assumed to be three cluster and hence three generator-detector pairs, namely: generator 1 (block 331) and detector 1 (block 341) form the generator-detector pair 92A for cluster 1; generator 2 (block 332) and detector 2 (block 342) form the generator-detector pair 92B for cluster 2; and generator 3 (block 333) and detector 3 (block 343) form the generator-detector pair 92C for cluster 3. The generator-detector pairs are individually trained by the computer system 400 as described in connection with FIGS. 2 and 3.

Under control of the computer system 400, a transmission switch 340 (implemented in software) makes different connections among the elements in FIG. 3A depending on the operation being performed by the system 90. During individual training, each generator (331, 332, or 333) is connected to its corresponding detector (341, 342, or 343). During development testing, a generator may be cross-connected to a different detector, for testing how well each generalizes to data that was used for training the other. In some embodiments, the set of real data training data for each generator-detector pair is disjoint from the data for other pairs. In some embodiments, there is some overlap in the real data training data used for the generator-detector pairs. A generator is trained to optimize its objectives, such as producing realistic data to fool the real-vs-generated discriminator 207 or 307 in the case of a GAN or minimizing the KL-divergence of the stochastic layer 203 or 303 in the case of a VAE, but a generator is not explicitly constrained from producing data that might also be produced by another generator.

In an illustrative embodiment, each detector 341, 342, and 343 is a multi-objective detector comprising a real-vs-generated detector and other objectives, so each generator 331, 332, and 333 is a "cluster" GAN, for generating data examples within a unique collection of data (e.g., a data category having multiple clusters), with additional objectives. Collectively, the cluster GANs 331, 332, 333 may constitute a composite GAN. To generate data representing a category, in a node 330, the computer system 400 selects one of the clusters in the category. Each cluster may be selected based on a probability distribution specified through computer system 400. In an illustrative embodiment of GAN training as a two-person game, there are two probability distributions with a probability distribution specifying the von Neumann mixed strategy of each of the two players. For a composite GAN, the collection of generators 331-333 represents one player. The computer system 400 trains the probabilities as learned parameters that specify how often the composite GAN generates data from each cluster, representing a von Neumann mixed strategy for the player. Using the generator for the selected cluster, say generator 2 for cluster 2, etc., the computer system 400 generates a data example for selected cluster (e.g., cluster 2) that is sent to the transmission switch 340.

When the system 90 is training the detectors 341, 342, 343, at the switch 340 the computer system 400 can receive real or generated data from block 335. The real or generated data 305 can be stored in an on-board and/or off-board of the computer system 400. If the data 305 is generated data, it may be generated by a data generator (not shown). The switch 340 sends the data from block 305 to each of the detectors 111-113, one for each cluster.

In selecting the real data used for training the composite GAN, the computer system 400 uses a similar set of probabilities 350 for selecting each of the training data items of real data, with the probabilities over the real data summing to 1.0, thereby representing a von Neumann mixed strategy for the second player, the real-vs-generated discriminator. In the absence of additional objectives, the optimum strategy for the player represented by the collection of generators 331-333 is to generate only the training data items and to generate each of the training data items with equal probability. For the player represented by the collection of detectors 341-343, the optimum strategy is to reject any data item that does not match a training data item and to specify the probability for each real data item to be equal to the probability of each of the other real data items. The additional objectives force the generator-detector pairs to generalize from the training data to jointly satisfy the multiple objectives.

From each cluster detector 341-343, the computer system 400 preferably feeds the "Detect" activation to two nodes. One destination is "Max Node" 351. The activation of Max Node 351 is the maximum of the activations of the "Detect" outputs of all the clusters in a specific category. For example, as shown in FIG. 3A, the activation value of the max node 351 equals the single greatest activation value for the Detect outputs for Detectors 1 through 3. The activation of node 351 may be used as the score for the category in a category classification task. The node 351 preferably receives back propagation during training for the classification task and in turn the computer system 400 back propagates the error cost function derivatives to the detector 341-343 that has the maximum value.

The second destination, in the cluster classification mode, is a dedicated node in the node set 361. There is one node in the node set 361 for each detector 341-343, and hence has one node for each cluster in the specified category. The computer system 400 sends the "Detect" activation of each cluster detector 341-343 to its respective, dedicated node in the node set 361. In the illustrative embodiment, the computer system 400 performs a softmax operation for the node set 361; that is, it normalizes the activations of its nodes to sum to one. During training, the node set 361 is trained by the computer system 400 for cluster classification. For each data example, the target for the node set 361 is a value of one for the correct cluster and a value of zero for all the other nodes. In the node set 361, the computer system 400 back propagates this objective to the cluster detectors 341, 342 and 343, respectively.

If a plurality of the generators 331, 332, 333 in FIG. 3A are GANs (i.e., "cluster GANs"), the introduction of probabilities in the node 330 fundamentally changes the composite GAN learning process. In the two-person game interpretation of a GAN, the probabilities in node 330 represent the probabilities of a von Neumann mixed strategy for choosing clusters by the player represented by the cluster GAN generators. The probabilities in node 350 represent the probabilities of a von Neumann mixed strategy for choosing real data 355 by the player represented by the real-vs-generated discriminators in the multi-objective detectors. The other objectives in the multi-objective detectors help improve the ability of the system 90 to learn to generalize but are not controlled by the "players" in the notional two-person game of GAN training. The fundamental theorem of the mathematical theory of games is von Neumann's fixed-point minimax theorem, which guarantees that there is a unique value for any two-person zero-sum game and that each player has a probabilistic mixed strategy that guarantees at least that unique value, no matter what strategy the other player may use. This theorem means that a GAN learning method based on von Neumann mixed strategies, such as illustrated in FIG. 3A, will converge to the von Neumann fixed-point value. In other words, a GAN learning method based on an embodiment such as illustrated in FIG. 3A avoids the stability problem of other GAN learning methods. In particular, it avoids the cyclical non-convergence behavior of the original GAN implementation based on the players alternately choosing pure strategies in the two-person zero-sum game model. It also avoids the problems caused by multiple Nash equilibria in non-zero-sum games because the von Neumann solution for zero-sum games is unique. The robustness of the 3-node detectors 341, 342, 343 shown in FIG. 3A and the multiple objectives are not required for the stability of the von Neumann solution. For example, one embodiment of FIG. 3A is for each detector 341, 342, 343 to simply be a copy of a decoder with multiple objectives, such as decoder 304 with the objectives 307, 319, 321, 322, and 328 shown in FIG. 3. Furthermore, the system illustrated in FIG. 3A may avoid mode collapse by having a separate cluster generator 331, 332, 333 for each mode. On the other hand, although the von Neumann mixed strategy by itself solves the stability problem, in preferred embodiments, multiple objectives, robust detectors, and cross-training and development testing are desirable because they contribute to the ability of the generator to learn to generalize to new data not contained in the training data.

FIG. 4 is a diagram of a computer system computer system 400 that could be used to implement the embodiments described above. The illustrated computer system 400 comprises multiple processor units 402A-B that each comprises, in the illustrated embodiment, multiple (N) sets of processor cores 404A-N. Each processor unit 402A-B may comprise on-board memory (ROM or RAM) (not shown) and off-board memory 406A-B. The on-board memory may comprise primary, volatile and/or non-volatile storage (e.g., storage directly accessible by the processor cores 404A-N). The off-board memory 406A-B may comprise secondary, non-volatile storage (e.g., storage that is not directly accessible by the processor cores 404A-N), such as ROM, HDDs, SSD, flash, etc. The processor cores 404A-N may be CPU cores, GPU cores and/or AI accelerator cores. GPU cores operate in parallel (e.g., a general-purpose GPU (GPGPU) pipeline) and, hence, can typically process data more efficiently that a collection of CPU cores, but all the cores of a GPU execute the same code at one time. AI accelerators are a class of microprocessor designed to accelerate artificial neural networks. They typically are employed as a co-processor in a device with a host CPU 410 as well. An AI accelerator typically has tens of thousands of matrix multiplier units that operate at lower precision than a CPU core, such as 8-bit precision in an AI accelerator versus 64-bit precision in a CPU core.

In various embodiments, the different processor cores 404 may train and/or implement different networks or subnetworks or components. For example, in one embodiment, the cores of the first processor unit 402A may implement the encoder 102 in FIG. 1 and the second processor unit 402B may implement the decoder 104. In other embodiments, different sets of cores in the first processor unit 402A may be responsible for the encoder 102 and the decoder 104. Also, one or more of the processor cores 404 and/or one or more of the processor units could implement other components in the systems herein, such as the near neighbor finder 105, the real-vs-generated discriminator 219, the distortion or noise detector 322, the multi-category classifier 321, etc. One or more host processors 410 may coordinate and control the processor units 402A-B.

In other embodiments, the system 400 could be implemented with one processor unit 402. In embodiments where there are multiple processor units, the processor units could be co-located or distributed. For example, the processor units 402 may be interconnected by data networks, such as a LAN, WAN, the Internet, etc., using suitable wired and/or wireless data communication links. Data may be shared between the various processing units 402 using suitable data links, such as data buses (preferably high-speed data buses) or network links (e.g., Ethernet).

The software for the various computer system 400s described herein and other computer functions described herein may be implemented in computer software using any suitable computer programming language such as .NET, C, C++, Python, and using conventional, functional, or object-oriented techniques. Programming languages for computer software and other computer-implemented instructions may be translated into machine language by a compiler or an assembler before execution and/or may be translated directly at run time by an interpreter. Examples of assembly languages include ARM, MIPS, and x86; examples of high level languages include Ada, BASIC, C, C++, C#, COBOL, Fortran, Java, Lisp, Pascal, Object Pascal, Haskell, M L; and examples of scripting languages include Bourne script, JavaScript, Python, Ruby, Lua, PHP, and Perl.

In one general aspect, therefore, the present invention is directed to machine-learning computer systems and computer-implemented methods for training a machine-learning data generator. In one embodiment, the method comprises training, with a computer system 400 that comprises a set of processor cores 404A-N, a machine-learning data generator 111, 211, 311, where training the data generator comprises training the data generator through machine-learning with multiple objectives, including: a first objective that the data generator generate, as output patterns, data patterns that match data patterns in a target set of data patterns; and a second objective that is different from the first objective.

A computer system according to one embodiment of the present invention comprises a set of processor cores 404A-N and computer memory (e.g., on-board or off-board memory 406A-B) that is in communication with the set of processor cores. The computer memory stores software that when executed by the set of processor cores, causes the set of processor cores to train the machine-learning data generator 111, 211, 311 through machine-learning with multiple objectives, including: a first objective that the data generator generate, as output patterns, data patterns that match data patterns in a target set of data patterns; and a second objective that is different from the first objective.

In various implementations, the data generator comprises a feed-forward neural network and training the data generator comprises training the data generator using stochastic gradient descent. Also, the first objective of the data generator may be to generate, as the output patterns, input patterns that are input to the data generator. In such cases, the data generator may comprise a deterministic autoencoder or a stochastic autoencoder, such as a variational autoencoder or a stochastic categorical autoencoder network. In other embodiments, the data generator may comprise a generative adversarial network.

In any of the above examples, the second objective may comprise an objective from an anti-plagiarism subsystem (e.g., components 105-107 of FIG. 1). The objective from the anti-plagiarism subsystem may back propagate partial derivatives of an anti-plagiarism penalty term through the data generator when an output pattern from the data generator is within a minimum threshold distance of a nearest neighbor pattern that is a nearest neighbor in a set of nearest neighbor candidate patterns to the output pattern. The computer software may store software that when executed by the set of processor cores causes the set of processor cores to generate the set of nearest neighbor candidate patterns with a Hopfield network or with an auto-associative memory. The computer memory may store software that when executed by the set of processor cores causes the set of processor cores to compute a distance between the output pattern and the nearest neighbor candidate pattern. The distance may comprise a Euclidean distance between the output pattern and the nearest neighbor candidate pattern. Also, the anti-plagiarism penalty term preferably is inversely related to the distance between the output pattern and the nearest neighbor candidate pattern.

In addition to or in lieu of the anti-plagiarism second objective, the multiple objectives may comprise a third (or second as the case may be) objective that is an output of a real-vs-generated discriminator, such that a generated-data penalty term is back-propagated to the data generator when an output pattern from the data generator is determined to be generated by the real-vs-generated discriminator.

In addition to or in lieu of the above objective, the multiple objectives may comprise an additional objective that is an output of a machine learning sub-system that comprises a classifier, such that partial derivatives of a classification objective of the machine-learning sub-system are back-propagated to the data generator. The machine-learning sub-system may comprise an ensemble of classifiers or a multi-target classification objective.

In addition to or in lieu of the above objective, the multiple objectives may comprise an objective that is an output of a machine-learning distortion detector, such that this objective back propagates an excess distortion penalty term to the data generator.

In another general aspect, the present invention is directed to a computer-implemented method that comprises the step of training, by a computer system 400 that comprises a set of processor cores 402A-N, a composite generative adversarial network (GAN) for producing data examples in a collection of data. The composite GAN comprises N generator-detector pairs 92A-C, where N>1. Each of the N generator-detector pair comprises: a cluster GAN 331-333 for generating data for one cluster in the collection of data, such that there are N clusters, one for each generator-detector pair; and a corresponding multi-objective classifier 341-343 for classifying data in the cluster of the corresponding cluster GAN of the generator-detector pair. Each of the N multi-objective classifiers 341-343 comprises a real-vs-generated discriminator for discriminating whether input data to the multi-objective classifier is real data or generated data. In training the cluster GANs 331-333 of the plurality of generator-detector pairs 92A-C, one of the N clusters is selected based on a first specified probability distribution. Additionally, in training the multi-objective classifiers 341-343, a probability that a training example for the multi-objective classifiers is a specific example of real data is set based on a second specified probability distribution.

In another general aspect, the present invention is directed to a computer system 400 that comprises a set of processor cores 402A-N and computer memory (e.g., off-board memory 406A-B) that stores software that, when executed by the set of processor cores, causes the set of processor cores to train a composite generative adversarial network (GAN) for producing data examples in a collection of data as described above.

In various implementations, the first specified probability distribution corresponds to a first von Neumann mixed strategy of a first player in a two-player GAN training game, and the second specified probability distribution corresponds to a second von Neumann mixed strategy of a second player in the two-player GAN training game. Also, the collection of data may comprise a data category As is apparent from the description above, a machine-learning data generator according to embodiments of the present invention can avoid generating data that is too similar to any previously known data example. Such generated, or "synthetic," data can be used in a wide variety of applications, such as to train computer-vision systems, image classifiers or other types of classifiers, etc.

The examples presented herein are intended to illustrate potential and specific implementations of the present invention. It can be appreciated that the examples are intended primarily for purposes of illustration of the invention for those skilled in the art. No particular aspect or aspects of the examples are necessarily intended to limit the scope of the present invention. Further, it is to be understood that the figures and descriptions of the present invention have been simplified to illustrate elements that are relevant for a clear understanding of the present invention, while eliminating, for purposes of clarity, other elements. While various embodiments have been described herein, it should be apparent that various modifications, alterations, and adaptations to those embodiments may occur to persons skilled in the art with attainment of at least some of the advantages. The disclosed embodiments are therefore intended to include all such modifications, alterations, and adaptations without departing from the scope of the embodiments as set forth herein.

What is claimed is:

1. A computer-implemented method comprising:
   training, with a computer system that comprises a set of processor cores, a machine-learning real vs. generated discriminator to discriminate whether output from a data generator is real or generated;
   training, with the computer system, through machine learning, a multi-category classifier such that a target output of the multi-category classifier comprises a target activation level for each of the multiple classification categories; and
   training, with the computer system, through machine learning, a machine-learning data generator, wherein training the machine-learning data generator comprises training the machine-learning data generator through machine-learning with multiple joint objectives, wherein the multiple joint objectives comprise:
      a first objective that the machine-learning data generator generate, as output patterns, data patterns that the machine-learning real vs, generated discriminator system classifies as real;
      a second objective that is different from the first objective, wherein the second objective imposes a penalty on a cost function for the data generator for an output pattern that is within a threshold distance of a nearest neighbor candidate pattern in a set of nearest neighbor candidate patterns for the output pattern; and
      a third objective that is different from the first and second objectives, wherein the third objective comprises a multi-target objective from the multi-category classifier, such that output patterns from the machine-learning data generator do not match the training data for the multi-category classifier.

2. The computer-implemented method of claim 1, wherein:
   the machine-learning data generator comprises a feed-forward neural network; and
   training the machine-learning data generator comprises training the machine-learning data generator using stochastic gradient descent.

3. The computer-implemented method of claim 1, wherein the machine-learning data generator comprises a stochastic autoencoder.

4. The computer-implemented method of claim 3, wherein the stochastic autoencoder comprises a variational autoencoder.

5. The computer-implemented method of claim 3, wherein the stochastic autoencoder comprises a stochastic categorical autoencoder network.

6. The computer-implemented method of claim of claim 1, wherein the machine-learning data generator comprises a generative adversarial network.

7. The computer-implemented method of claim 1, wherein the second objective back propagates partial derivatives of the penalty through the machine-learning data generator when an output pattern from the machine-learning data generator is within the threshold distance of the nearest neighbor candidate pattern in the set of nearest neighbor candidate patterns for the output pattern.

8. The computer-implemented method of claim 7, further comprising generating, by the computer system, the set of nearest neighbor candidate patterns with a Hopfield network.

9. The computer-implemented method of claim 7, further comprising generating, by the computer system, the set of nearest neighbor candidate patterns with an auto-associative memory.

10. The computer-implemented method of claim 7, further comprising computing, by the computer system, a distance between the output pattern and the nearest neighbor candidate pattern.

11. The computer-implemented method of claim 10, wherein computing the distance comprises computing a Euclidean distance between the output pattern and the nearest neighbor candidate pattern.

12. The computer-implemented method of claim 10, wherein the penalty is inversely related to the distance between the output pattern and the nearest neighbor candidate pattern.

13. The computer-implemented method of claim 1, wherein the first objective imposes a generated-data penalty term that is back-propagated to the machine-learning data generator when an output pattern from the machine-learning data generator is determined by the machine-learning real vs. generated discriminator system to be generated rather than real.

14. The computer-implemented method of claim 1, wherein the multiple joint objectives comprise a fourth objective that is an output of a machine-learning distortion detector, such that the fourth objective back propagates an excess distortion penalty term to the machine-learning data generator.

15. The method of claim 1, wherein:
training the real vs. generated discriminator comprises training the real vs. generated discriminator with real vs. generated training data; and
training the multi-category classifier comprises training the multi-category classifier with training data from the real vs. generated training data.

16. A machine-learning computer system comprising:
a set of processor cores; and
computer memory that is in communication with the set of processor cores, wherein the computer memory stores software that when executed by the set of processor cores, causes the set of processor cores to:
train a machine-learning real vs. generated discriminator system that is trained, with real data in a training set of real data, to discriminate real data from generated data;
train through machine learning a multi-category classifier such that a target output of the multi-category classifier comprises a target activation level for each of multiple classification categories;
train a machine-learning data generator with multiple joint objectives, wherein the multiple joint objectives comprise:
a first objective that the machine-learning data generator generate, as output patterns, data patterns that the machine-learning real vs. generated discriminator system classifies as real;
a second objective that is different from the first objective, wherein the second objective imposes a penalty on a cost function for the data generator for an output pattern that is within a threshold distance of a nearest neighbor candidate pattern in a set of nearest neighbor candidate patterns for the output patter; and
a third objective that is different from the first and second objectives, wherein the third objective comprises a multi-target objective from the multi-category classifier, such that output patterns from the data generator do not match the training data for the multi-category classifier.

17. The machine-learning computer system of claim 16, wherein:
the machine-learning data generator comprises a feed-forward neural network; and
training the machine-learning data generator comprises training the machine-learning data generator using stochastic gradient descent.

18. The machine-learning computer system of claim 16, wherein the machine-learning data generator comprises a stochastic autoencoder.

19. The machine-learning computer system of claim 18, wherein the stochastic autoencoder comprises a variational autoencoder.

20. The machine-learning computer system of claim 18, wherein the stochastic autoencoder comprises a stochastic categorical autoencoder network.

21. The machine-learning computer system of claim 16, wherein the machine-learning data generator comprises a generative adversarial network.

22. The machine-learning computer system of claim 16, wherein the second objective back propagates partial derivatives of the penalty through the machine-learning data generator when an output pattern from the machine-learning data generator is within the threshold distance of the nearest neighbor candidate pattern in the set of nearest neighbor candidate patterns to the output pattern.

23. The machine-learning computer system of claim 22, wherein the computer memory stores software that when executed by the set of processor cores causes the set of processor cores to generate the set of nearest neighbor candidate patterns with a Hopfield network.

24. The machine-learning computer system of claim 22, wherein the computer memory stores software that when executed by the set of processor cores causes the set of processor cores to generate the set of nearest neighbor candidate patterns with an auto-associative memory.

25. The machine-learning computer system of claim 16, wherein the first objective imposes a generated-data penalty term is back-propagated to the machine-learning data generator when an output pattern from the machine-learning data generator is determined by the machine-learning real vs. generated discriminator system to be generated rather than real.

26. The machine-learning computer system of claim 16, wherein the multiple joint objectives comprise a fourth objective that is an output of a machine-learning distortion detector, such that the fourth objective back propagates an excess distortion penalty term to the machine-learning data generator.

27. The machine-learning computer system of claim 16 wherein the computer memory stores software that when executed by the set of processor cores causes the set of processor cores to:
- train the real vs. generated discriminator training the real vs. generated discriminator with real vs. generated training data; and
- train the multi-category classifier training the multi-category classifier with training data from the real vs. generated training data.

* * * * *